United States Patent
Robra et al.

[11] 3,805,575
[45] Apr. 23, 1974

[54] EXTRUSION PRESS HAVING MEANS FOR REMOVING AN EXTRUSION BUTT THEREFROM

[75] Inventors: Helmut Robra, Mulheim/Ruhr; Alfred Steinmetz, Dusseldorf, both of Germany

[73] Assignee: Schloemann Aktiengesellschaft, Dusseldorf, Germany

[22] Filed: June 29, 1972

[21] Appl. No.: 267,600

[30] Foreign Application Priority Data
June 30, 1971 Germany............................ 2182376

[52] U.S. Cl..................................... 72/255, 72/257
[51] Int. Cl........................................... B21c 23/00
[58] Field of Search........................ 72/255, 257, 426

[56] References Cited
UNITED STATES PATENTS
3,129,818  4/1964  Behrendt ............................. 72/255
3,373,592  3/1968  Robra ................................... 72/255
3,220,237  11/1965 Govan ................................... 72/255
3,462,991  8/1969  Asari .................................... 72/257

Primary Examiner—Charles W. Lanham
Assistant Examiner—Robert M. Rogers
Attorney, Agent, or Firm—Holman & Stern

[57] ABSTRACT

A discharge chute is provided for removing an extrusion butt from a horizontal extrusion press, with the extrusion butt having been sheared off by a shear blade which moves downwards between the container and the extrusion die. The discharge chute is pivoted and is held against the bottom of the extrusion butt by a resilient force so that as the extrusion butt is sheared off, the discharge chute pivots downwards against the resilient force while remaining in contact with the bottom of the extrusion butt, with the extrusion butt subsequently passing down the discharge chute whereby any free-fall of the extension butt is avoided.

11 Claims, 2 Drawing Figures

EXTRUSION PRESS HAVING MEANS FOR REMOVING AN EXTRUSION BUTT THEREFROM

BACKGROUND OF THE INVENTION

The invention relates to means for removing an extrusion butt (which may be referred to as a stump) from a horizontal extrusion press in which a counterplaten and a container holder are slidable relative to each other and a cropping blade may be e.g. vertically reciprocated between the counterplaten and the container holder.

In general in horizontal metal extrusion presses, a container holder is slidable relative to a counterplaten adapted to support a die. A billet disposed in the container is thrust through the die by means of a ram, with the container holder and the counterplaten being disposed closely adjacent to each other. It is sometimes not possible to extrude the entire billet through the die, leaving an extrusion butt behind the die and connected to the remainder of the extrusion. This extrusion butt must be cropped off and removed from the extrusion press.

SUMMARY OF THE INVENTION

The present invention provides a horizontal extrusion press having a counterplaten,
a holder for an extrusion die,
a holder for an extrusion container,
means for withdrawing the container holder relative to the counterplaten,
a shear blade having a vertical component of movement (and preferably being substantially vertically movable), for insertion with a downwards component of movement between the container and the die and thereby cutting off an extrusion butt,
a pivotally mounted discharge chute having a butt receiving end for receiving the extrusion butt which has been cut off by the shear blade, and
means for moving the butt receiving end of the discharge chute upwards to a position adjacent the extrusion axis (and preferably on the extrusion axis), in which position the discharge chute is downwardly inclined, and for moving the butt receiving end downwards away from said position, said moving means including means for applying a retaining force to the butt receiving end for retaining the butt receiving end in said position, which retaining means permit the butt receiving end to be thrust downwards against said retaining force when the butt is cut off by the shear blade.

When the container holder has been withdrawn relative to the counterplaten, the butt receiving end of the chute is pivoted upwards until it bears upwards against the extrusion butt which is to be cropped. The extrusion butt is cropped off with the downward-moving shear blade and is thrust against the chute which in turn will be thrust downwards due to the force exerted by the shear blade. The extrusion butt will not therefore drop on to the chute, in other words the extrusion butt has no free-fall onto the chute. After the extrusion butt has been cropped off, it will slide down the chute and out of the extrusion press. The butt receiving end of the chute is pivoted downwardly before the container holder and the counterplaten are driven towards each other. The chute will be disposed in a lowered position between the container holder and the counterplaten when the container holder has been moved up against the die held on the counterplaten.

The retaining force is preferably a resilient force. The butt receiving end of the chute may be retained in said position by a spring which is compressed when the extrusion butt is cropped off; in other words, said retaining force may be a spring force. However, said moving means may include a piston-cylinder device, and it is advantageous if the chute is mounted on a tubular member which is pivotally carried on a lower column of the extrusion press and a piston-cylinder device may act on the tubular member for the purpose of pivoting same; if the counterplaten is fixed, the tubular member may be linked to the container holder so that the discharge chute moves axially with the container holder.

In this embodiment, the piston-cylinder device, which may be biased with compressed air, supplies the resilient force, with the piston-cylinder device also serving to pivot the chute. Displacement of the container holder moves the chute into one position in which it may be pivoted upwardly and into another position in which it is disposed below the die. The pivoting bearing system (using the tubular member and one column) and the arrangement for sliding the chute axially is space-saving and may be achieved at low cost.

The invention will be further described, by way of example, with reference to the accompanying drawings in which drawings:

DETAILED DESCRIPTION OF THE INVENTION

Figure 1:
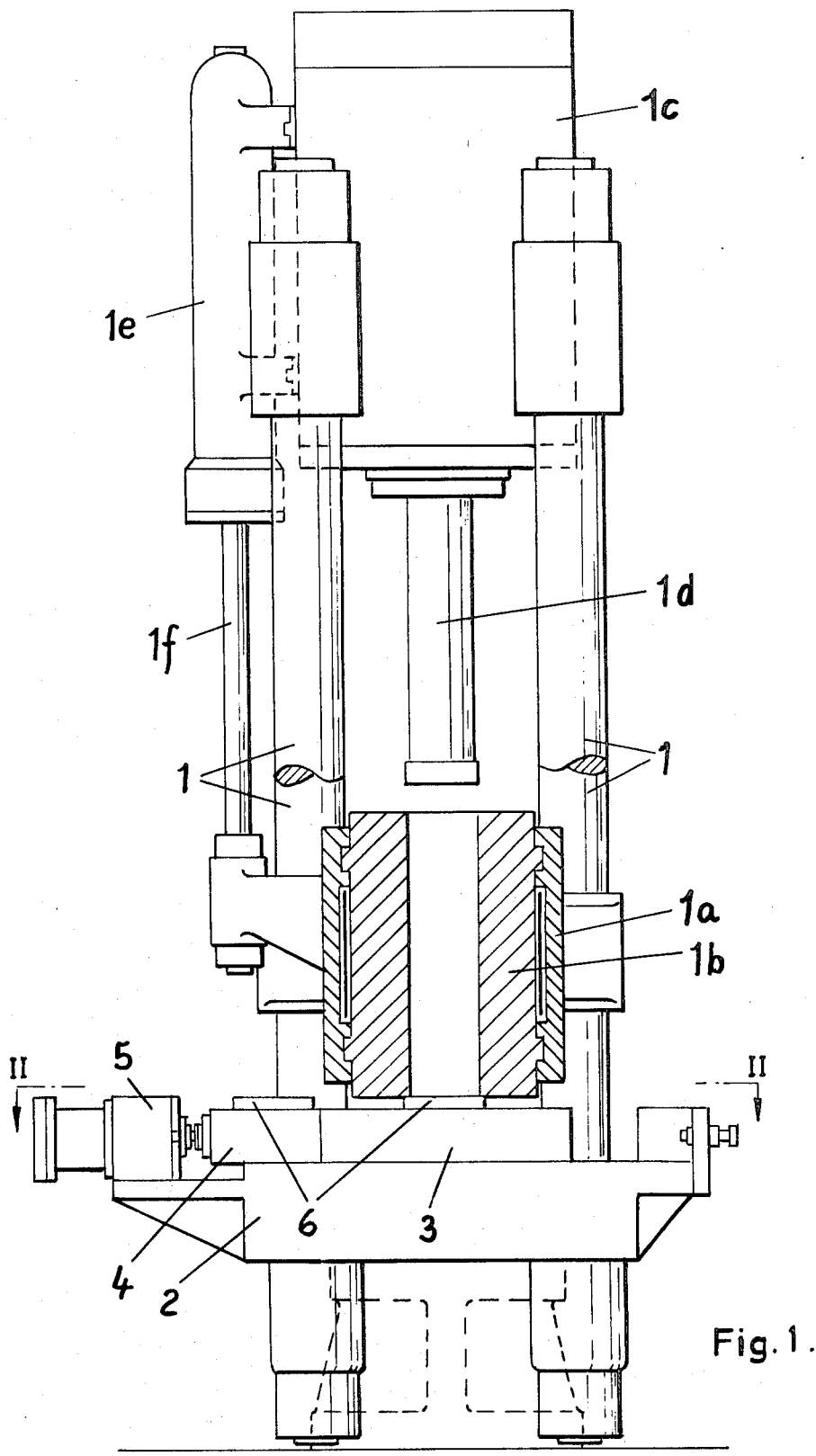
FIG. 1 is a plan view of a horizontal four-column metal extrusion press in accordance with the invention, the container being shown in axial section and in its advanced position, with the cropping shear and associated piston-cylinder unit being omitted.

The extrusion press shown in the drawings has four parallel columns 1 each having one end secured to a stationary counterplaten 2. A container holder (1a is adapted to slide on the columns 1 in known manner (e.g. shown in FIG. 13 on page 367 of Siemens Zeitschrift, Volume 19, August 1939, No. and holds a container 1b into which is inserted the billet to be extruded. The rear ends of the column 1 are secured to a piston-cylinder unit 1c for actuating a draw rod for withdrawing the container holder 1a.). Guides 3 are provided on the side of the counterplaten 2 which faces the container holder, and a die slide 4 may be displaced horizontally in these guides 3 by means of one or more traversing cylinders 5. At least one die 6 (the tool) is supported in the die slide 4, with a strand being extruded through the die 6 when it is disposed on the axis of the extrusion press.

The container (1b) bears on the end face of the die 6 when a strand is extruded so that a billet, initially disposed in the container, may be extruded through the die. If the billet is not completely extruded for any reason, an extrusion butt will remain in the container and will be drawn out of the container when the container holder is withdrawn and will project out of the die 6.

A shear blade 7, disposed above the die 6 when the die is in use and vertically movable by means of a piston-cylinder unit (ram) 8, is provided for cropping off the extrusion butt. When the shear blade 7 is moved downwardly, it will shear off the extrusion butt from the extruded material in the die by co-operating with the die 6 (the lower half of the die 6, in effect, acting as a stationary shear blade), this shearing movement being accompanied by the extrusion butt being thrust downwardly.

Figure 2:
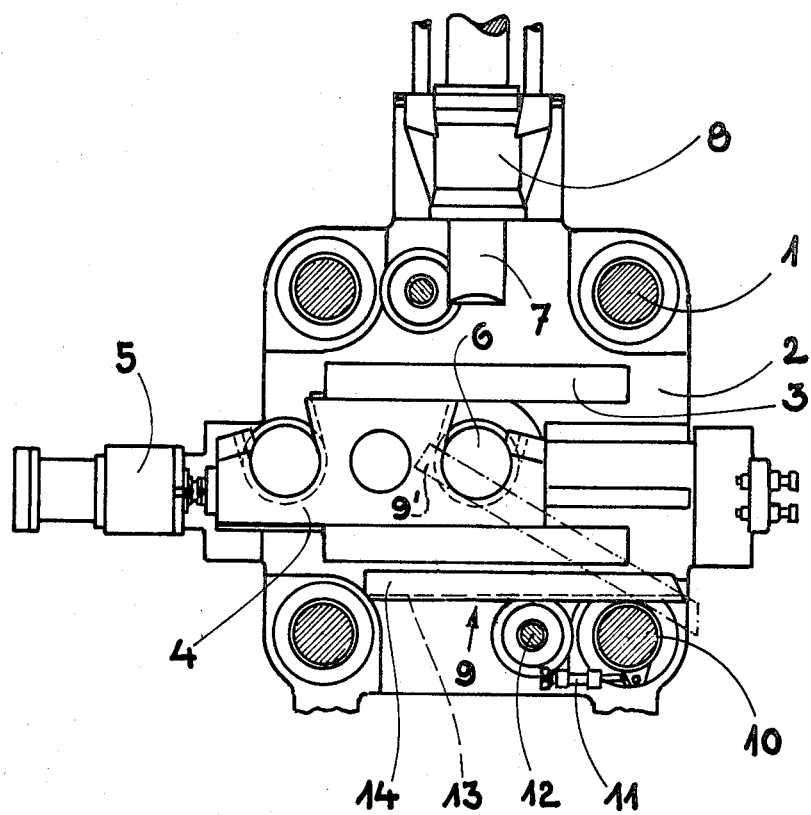
FIG. 2 is a vertical section taken along the line II—II of FIG. 1.

One end of a chute 9 is pivotably supported on one of the two lower columns 1, the free end of the chute being upwardly pivotable in front of the die 6. The chute 9 has a base 13 on which the extrusion butt bears when it slides downwardly, and two side walls 14 for guiding the extrusion butt. The upwardly pivoted chute is shown at 9' in broken lines in FIG. 2. Prior to the cropping operation, the free end of the chute is pivoted upwardly until it bears on the extrusion butt. When the extrusion butt is cropped off, the free end of the chute is thrust downwardly by the extrusion butt and thus by the shear blade 7. On being released by the shear blade, the cropped extrusion butt will slide down the chute, the chute once again being pivoted upwardly when the shear blade is retracted so that the gradient of the chute is increased.

The chute is fixed to the top of a tubular member 10 which may be pivoted on one of the two lower columns 1. The tubular member 10 is pivotably joined to the container holder in a manner not shown so that it participates in the sliding motion of the container holder. A piston rod of a pneumatic piston-cylinder unit (ram) 11 is pivoted on the underside of the tubular member 10, with the cylinder of the unit 11 being pivoted to a rod 12 disposed between the two lower columns 1, with the rod 12 also providing a support for the lower chute. The chute 9 pivots upwardly if the piston rod of the piston-cylinder unit 11 is retracted, the compressibility of the compressed air disposed in the piston-cylinder unit permitting the chute to be pivoted downwards a little when the extrusion butt is being sheared off. The chute 9 lowers if the piston rod of the piston-cylinder unit 11 is extended.

We claim:

1. A horizontal extrusion press comprising: an extrusion ram; a counterplaten; means connecting the counter-platen to the extrusion ram; a holder for an extrusion die; a holder for an extrusion container; means for withdrawing the container holder relative to the counterplaten; a substantially vertically movable shear blade for insertion downwards between the container and the die and for thereby cutting off an extrusion butt; a pivotally mounted discharge chute having a butt receiving end for receiving the extrusion butt which has been cut off by the shear blade; and means for moving the butt receiving end of the discharge chute upwards to a position adjacent the extrusion axis of the extrusion press, in which position the discharge chute is downwardly inclined, and for moving the butt-receiving end downwards away from said position, said moving means comprising means for applying a resilient force to the but receiving end for retaining the butt receiving end in said position, which retaining means permit the butt-receiving end to be thrust downward against said recilient force by the extrusion butt when the extrusion butt is cut off by the shear blade, the extrusion butt subsequently passing down the discharge chute whereby any free-fall of the extrusion butt is avoided.

2. The extrusion press as claimed in claim 1, wherein said moving means comprise a piston-cylinder device for moving the butt receiving end and for applying said resilient force to the butt receiving end.

3. The extrusion press as claimed in claim 1, wherein said connecting means comprise upper and lower columns, a tubular member pivotally carried on a lower column, and said discharge chute being mounted on said tubular member.

4. The extrusion press as claimed in claim 2, wherein said connecting means comprise upper and lower columns, a tubular member pivotally carried on a lower column, and said discharge chute being mounted on said tubular member.

5. The extrusion press as claimed in claim 4, wherein the piston-cylinder device has two members which are movable relative one of to the other by pressure fluid, one said members of the piston-cylinder device being articulated directly to the tubular member.

6. The extrusion press as claimed in claim 3, wherein the counterplaten is fixed, and the tubular member being linked to the container holder so that the discharge chute moves axially with the container holder.

7. The extrusion press as claimed in claim 4, wherein the counterplaten is fixed, and the tubular member being linked to the container holder so that the discharge chute moves axially with the container holder.

8. The extrusion press as claimed in claim 5, wherein the counterplaten is fixed, and the tubular member being linked to the container holder so that the discharge chute moves axially with the container holder.

9. A horizontal extrusion press comprising:
an extrusion ram; a counterplaten; means for connecting the counterplaten to the extrusion ram; a holder for an extrusion die; a holder for an extrusion container; means for withdrawing the container holder relative to the counterplaten; a blade for insertion between the container and the die and for thereby cutting off an extrusion butt; a pivotally mounted discharge chute having a butt-receiving end for receiving the extrusion butt which has been cut off by the blade; and means for moving the butt-receiving end of the discharge chute upwards to a position adjacent the extrusion axis of the extrusion press, in which position the discharge chute is downwardly inclined, and for moving the butt receiving end downwards away from said position, said moving means also applying a force to keep the butt-receiving end in contact with the underside of the extrusion butt and permitting the butt-receiving end to be thrust downward against said force by the extrusion butt when the extrusion butt is cut off by the blade, the extrusion butt subsequently passing down the discharge chute whereby any free-fall of the extrusion butt is avoided.

10. The extrusion press as claimed in claim 1, further including means linking the discharge chute to the container holder so that the discharge chute moves axially with the container holder.

11. The extrusion press as claimed in claim 9, further including means linking the discharge chute to the container holder so that the discharge chute moves axially with the container holder.

* * * * *